United States Patent [19]

Redick et al.

[11] Patent Number: 4,608,402

[45] Date of Patent: Aug. 26, 1986

[54] SURFACE TREATMENT OF PITCH-BASED CARBON FIBERS

[75] Inventors: Hugh E. Redick, Simpsonville, S.C.; Russell D. Barnes, Belews Creek, N.C.

[73] Assignee: E. I. Du Pont de Nemours and Company, Wilmington, Del.

[21] Appl. No.: 764,060

[22] Filed: Aug. 9, 1985

[51] Int. Cl.$^4$ ............................................. C08K 3/04
[52] U.S. Cl. .................................... 523/215; 523/468; 423/447.6; 106/307
[58] Field of Search ................ 523/215, 468; 106/307; 423/447.6; 8/115.51

[56] References Cited

U.S. PATENT DOCUMENTS

| | | | |
|---|---|---|---|
| 3,595,946 | 7/1971 | Joo et al. | 423/447.6 |
| 3,639,953 | 2/1972 | Kimura et al. | 423/447.6 |
| 3,723,607 | 3/1973 | Kalnin | 106/307 |
| 3,745,104 | 7/1973 | Hou | 423/447.6 |
| 3,754,957 | 8/1973 | Druin et al. | 106/307 |

OTHER PUBLICATIONS

Drzal, The Surface Composition and Energetics of Type A Graphite Papers, 1977, 129–138.

Primary Examiner—Lewis T. Jacobs

[57] ABSTRACT

The adhesion of pitch-based carbon fiber to organic resin is improved by treatment at room temperature with a gaseous atmosphere containing from 100 to 1000 parts per million of ozone.

6 Claims, No Drawings

SURFACE TREATMENT OF PITCH-BASED CARBON FIBERS

BACKGROUND OF THE INVENTION

Greater shear strength for fiber reinforced composites is achieved by improving the fiber to matrix bond. A strong bond reduces the chance of failure at the interface. The strength of bonding may be measured in accordance with ASTM D 2344-76 and is referred to as interlaminar shear strength (ILSS). U.S. Pat. No. 3,723,607 deals with modification of the surface characteristics of amorphous or graphitic carbon fiber to provide enhanced adhesion between the fibrous material and a resinous matrix material. In this prior art patent, the fibrous material is first treated with an inert gaseous atmosphere at a temperature of about 900° to 1400° C. for at least 30 seconds and then, according to the examples given, is immediately placed in a heat treatment zone containing ozone. The patent teaches that the ozone treatment should be carried out in an atmosphere containing about 1500 to 110,000 parts per million of ozone and at a temperature of about 75° to 175° C. Failure to carry out either the high temperature inert gas treatment or the ozone treatment is taught to give inferior adhesion results although such results are said to be better than that obtained if neither treatment is applied. Use of temperatures below 75° C. for the ozone treatment is said in the patent to slow down the modification to an inordinate extent. The patent does not disclose the treatment of pitch-based carbon fiber. Modification of the surface of pitch-based carbon fiber to increase adhesion to matrix polymer of composites is a worthwhile objective.

SUMMARY OF THE INVENTION

The present invention provides a pitch-based carbon fiber of improved adhesion by a process comprising exposing a pitch-based carbon fiber at room temperature to a gaseous atmosphere containing from about 100 to 1000 parts per million of ozone for a period of at least 30 seconds.

DETAILED DESCRIPTION OF THE INVENTION

Pitch-based carbon fiber is produced by the melt-spinning of pitch followed by oxidative stabilization of the fiber and finally carbonization at elevated temperatures in an inert atmosphere. This process is generally described in the prior art. By "pitch-based" is meant that the carbon fiber was derived from a fiber spun from pitch. This is to be distinguished from the well-known PAN-based or other fibers. The carbon fiber employed as the precursor in this invention can be spun from any of a variety of pitches. One such pitch is that prepared as described in U.S. Pat. No. 4,277,324. The pitch is then melt-spun by conventional techniques and subjected to an oxidation stabilization step and finally to a carbonization step. As pointed out in U.S. Pat. No. 3,976,729, the as-spun fibers must be stabilized (thermoset) because of their thermoplastic nature before they can be carbonized. The conditions under which the as-spun pitch fibers are first stabilized and then oxidized are spelled out in the aforementioned U.S. Pat. No. 3,976,729. At this point the fiber is in condition to be treated in accordance with the present process to improve its adhesion characteristics. The instant process provides these advantages without tensile strength or modulus loss.

In practice the carbonized fiber would be passed directly to a chamber, preferably of stainless steel for the ozone treatment, however, satisfactory results are also obtained where the fiber is lagged for some period before the ozone treatment. Preferably the chamber should have means for transporting the fiber through the chamber at the desired rate and for supplying a gaseous medium containing ozone to the chamber.

In contradistinction to the prior art ozone treatment of U.S. Pat. No. 3,723,607 the present invention works well at room temperature and at small concentrations of ozone. One advantage of room temperature operation is of course energy savings. Another is the fact that damage to the fiber and/or equipment caused by use of ozone at elevated temperature is thereby minimized.

Applicants have found that concentrations of ozone below 1000 parts per million of treatment atmosphere on a wt. basis give good results. Gaseous atmospheres, e.g., air, containing from about 100 to 1000 parts per million by wt. can be used. This means that economies are achieved as compared with the prior art process of U.S. Pat. No. 3,723,607. The gaseous medium should be dry.

Any period of treatment can be expected to produce improved adhesion properties, however, the ozone treatment should be performed for at least about 30 seconds, preferably for at least 2 minutes. When using ozine concentrations at the lower end of the acceptable range, longer periods of treatment may be found desirable.

The treated fiber is particularly useful to reinforce composites having an organic resin matrix, preferably an epoxy matrix. Generally from 5 to 80% by volume of fiber is used.

The example that follows is submitted for illustrative purposes only and is not intended to limit the invention. It shows that the adhesion between fiber and epoxy resin in a composite structure is greatly improved by virtue of the treatment of the invention.

EXAMPLE

Pitch-based carbon fiber was passed through a stainless steel treatment chamber supplied with dry room-temperature air containing 0.098% (980 ppm) ozone. The flow of the dry air-ozone mixture into the treatment chamber (14 in. × 6 in. × 16 ft. in length) was maintained at 1 cfm. Residence time in the treatment chamber was 4 minutes. Samples of the yarn so treated ("test") were collected along with control samples wherein the aforesaid treatment chamber was either by-passed or the ozone generator shut off.

Test composites were prepared, and tested in accordance with A.S.T.M. D-2344-76. Yarn was passed through a tensioning device and impregnated with the following liquid matrix resin: 100 parts by weight of epoxy resin (Epon 826 Shell Chemical Co.) and 30 parts by weight of curing agent (Tonox, Uniroyal Co.). Resin coated fiber was wound into the cavities of a rectangular mold having two cavities that are 6 in. long × ¼ in. wide and ½ in. deep. Two cover plates were laid on the cavities and screws were partially tightened to hold the cover plates to the mold. Four shims were placed between the mold and the cover plates to give desirable sample thickness. The complete mold was then placed in a vacuum chamber at room temperature and at 20 inch Hg vacuum for 5 hours to degas the resin. All screws were tightened and the sample cured in the vacuum oven overnight (16 hrs.) at 100° C. The cured compostes were cooled down to ambient temperature. The screws and cover plates of the molds were removed. (All metal parts were sprayed with mold release before winding for easy disassembly). The composite was cut with a saw to give two unidirectional filament wound samples of 6 in. long × ¼ in. wide × ½ in. thick. Fiber volume was 60% and all fiber is aligned in the length direction. Interlaminar Shear Strength (ILSS) was measured according to the test procedures of ASTM D 2344-76. A span to depth ratio of 4:1 was employed as well as loading at three points. The test (treated) fiber composites had ILSS values of 12.4–12.9 kpsi whereas the ILSS values of the respective controls were 7.1–7.9. These values represent 1.6–1.7× improvement and, more significantly, provide ILSS values in the range of commercial composites prepared from PAN-based carbon fibers.

Other experiments involving the treatment of pitch-based carbon fiber at ozone concentrations of 0.015% (150 ppm) have also shown marked improvement in ILSS values.

In related experiments it was shown that increases in ozone concentration, exposure time and/or temperatures provided little, if any, improvement and, at higher temperatures (∼200° C.) the ILSS values were in fact reduced (11–12 kpsi). The combination of high temperatures and high ozone concentrations also are known to be injurious to equipment used to produce and/or to confine such mixtures and to adversely affect tensile strength of the fiber.

We claim:

1. A process for improving the adhesion of a pitch-based carbon fiber for use in organic resin matrix composites comprising exposing the fiber at room temperature to a gaseous atmosphere containing from about 100 to 1000 parts per million of ozone for a period of at least 30 seconds.

2. The process of claim 1 wherein the gaseous atmosphere is dry air containing the ozone.

3. The process of claim 1 wherein the treatment period is at least 2 minutes.

4. A product produced by the process of claim 1.

5. A composite comprising an organic resin matrix reinforced with the fiber of claim 1.

6. A composite according to claim 5 wherein the resin is an epoxy resin.

* * * * *